March 30, 1954     G. H. SPECKMAN ET AL     2,673,701

SELF-BALANCING SERVICE LIGHT

Filed May 3, 1949

Inventors
Gilbert H. Speckman
Clifford H. Speckman

By *Clarence A. O'Brien and Harvey B. Jacobson*
Attorneys

Patented Mar. 30, 1954

2,673,701

UNITED STATES PATENT OFFICE 2,673,701

SELF-BALANCING SERVICE LIGHT

Gilbert H. Speckman and Clifford H. Speckman, Aurora, Ind.

Application May 3, 1949, Serial No. 91,122

3 Claims. (Cl. 248—158)

This invention relates to novel and useful improvements in service lamps of the mobile type.

An object of this invention is to retain a service lamp beneath an object in a predetermined position, the service lamp being maintained substantially vertically by means of a counterweight operatively connected with an axle which has wheels at opposite ends thereof whereby the service lamp may be moved from one position to another beneath an article on which work is to be performed such as a vehicle on a lift.

Another object of this invention is to retain the device on a slightly inclined surface such as a floor through the utility of an improved brake mechanism which includes one or more swingingly mounted stops passing through recesses provided in the counterweight and attached to the axle of the device, the steps being longer than the distance between the bottom of the wheels and the axle portion on which the stops are mounted.

Ancillary objects and features of novelty will become apparent to those skilled in the art, in following the description of the preferred form of the invention, illustrated in the accompanying drawings, wherein.

Figure 1:
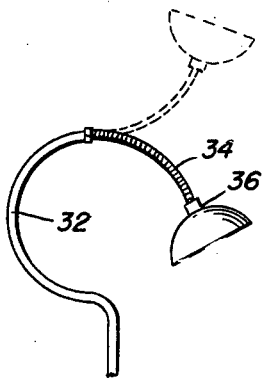
Figure 1 is an elevational view of the device.
Figure 2:
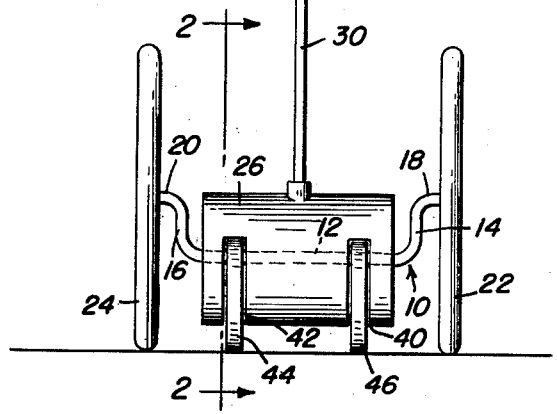
Figure 2 is a sectional view taken substantially on the line 2—2 of Figure 1 and in the direction of the arrows.
Figure 3:
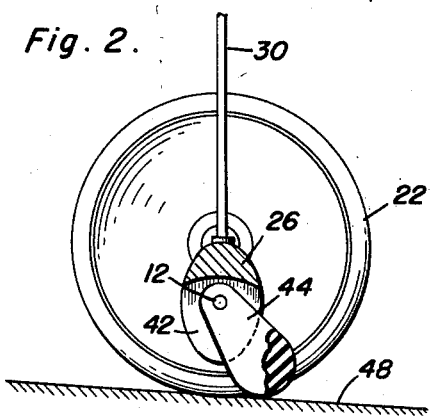
Figure 3 is a perspective view of the counterweight which is used in connection with the device.

Various service lights or lamps are known in the art. Many of them are portable in nature. This service lamp construction forming the device is adapted for use primarily in connection with undercarriage work on a vehicle when the vehicle is retained in the elevated position, as on a lift.

Usually, garage and service station floors are made at a slight angle of inclination for drainage purposes. This inclination is used to advantage in that the wheeled vehicle has a tendency to roll to the lower part thereof at all times. Therefore, braking action effective in only one direction is all that is necessary for effective braking of the device. Accordingly, due to the angle of inclination of the average floor and braking action in one direction, a structure is provided whereby the wheeled vehicle or carriage may be operated in the direction opposite that involved in the braking of the device.

An axle 10 is used and consists of a center section or portion 12 having at each end upwardly extending portions 14, 16 and outwardly extending portions 18, 19, respectively. Disposed on the outwardly extending portions is a pair of wheels 22 and 24, respectively, which are used for the purpose of permitting the device to roll from one location to another.

A counterweight 26 is disposed on the center portion 12, being fixed thereto by any suitable means. The counterweight may be formed integral with the center portion 12 as a manufacturing expediency. Since the counterweight is disposed below the axis of rotation of the wheels on the center portion 12, the standard 30 which is fixed to the counterweight or to the center section 12, as desired, is maintained in the upright position.

The uppermost portion of the standard 30 is smoothly curved, as at 32, and has a flexible member 34 fixed thereto. This flexible member is provided with a lamp-receiving socket device 36 and may be flexed to various positions due to the presence of the flexible member 34.

Recesses 40 and 42, respectively, are supplied in the lower part of the counterweight 26 and these recesses or openings have stops or brake elements 44 and 46 disposed therein for swinging movement. They are swingingly mounted on the center portion 12 of the axle 10.

The distance between the lower part portions of the wheels 22 and 24 and the center section or portion 12 of the axle is exceeded by the distance between the lower ends of the brake members or stops 44 and 46 and the center portion 12 of the axle.

An off-center arrangement of the stops is provided in this manner. Therefore, when the device is disposed on a surface 48 which has a slight angle of inclination, the brake elements 44 and 46 which may be of any suitable material, preferably hard rubber, will bind between the center portion 12 of the axle and the surface 48. This will prevent movement of the device in the downward direction but will not prevent movement in the opposite direction, since the stops 44 and 46 are free to swing about the center portion 12 of the axle.

It is apparent that variations may be made without departing from the spirit of the invention.

Having described the invention, what is claimed as new is:

1. In combination, a base and a standard mounted on said base, said base including an axle, wheels rotatably journaled on the ends of said axle, an elongated counterweight mounted on said axle and having the lower portion thereof disposed below said axle, said counterweight having at least one downwardly opening notch in the lower portion thereof, an elongated stop swingably mounted at one end in said notch and having a free end depending below the periphery of said counterweight, said stop free end extending beyond the ground engaging peripheral edge of the wheels whereby the base is normally permitted to move in only one direction.

2. In combination, a base and a standard mounted on said base, said base including an axle, wheels rotatably journaled on the ends of said axle, an elongated counterweight mounted on said axle and having the lower portion thereof disposed below said axle, said counterweight having at least one downwardly opening notch in the lower portion thereof, an elongated stop swingably mounted on one end in said notch and having a free end depending below the periphery of said counterweight, said stop free end extending beyond the ground engaging peripheral edge of the wheels whereby the base is normally permitted to move in only one direction, a portion of said axle extending through said notch, said one end of said stop member being rotatably journaled on said axle.

3. In combination, a base and a standard mounted on said base, said base including an axle, wheels rotatably journaled on the ends of said axle, an elongated counterweight mounted on said axle and having the lower portion thereof disposed below said axle, said counterweight having at least one downwardly opening notch in the lower portion thereof, an elongated stop swingably mounted on one end in said notch and having a free end depending below the periphery of said counterweight, said stop free end extending beyond the ground engaging peripheral edge of the wheels whereby the base is normally permitted to move in only one direction, a portion of said axle extending through said notch, said one end of said stop member being rotatably journaled on the portion of said axle extending through said notch, said standard being mounted on the upper portion of said counterweight.

GILBERT H. SPECKMAN.
CLIFFORD H. SPECKMAN.

References Cited in the file of this patent

UNITED STATES PATENTS

| Number | Name | Date |
|---|---|---|
| 128,113 | Chinnock | June 18, 1872 |
| 1,905,123 | Barbe | Apr. 25, 1933 |
| 2,183,419 | Barbe | Dec. 12, 1939 |
| 2,245,800 | McDonald | June 17, 1941 |
| 2,354,845 | Thornton | Aug. 1, 1944 |
| 2,453,967 | Browne | Nov. 16, 1948 |

FOREIGN PATENTS

| Number | Country | Date |
|---|---|---|
| 812,509 | France | May 12, 1937 |